Jan. 15, 1946.    E. L. HARDER    2,393,044
QUICK ACTING VOLTAGE-REGULATOR SYSTEM
Original Filed Oct. 30, 1942

WITNESSES:

INVENTOR
Edwin L. Harder.
BY O.B. Buchanan
ATTORNEY

Patented Jan. 15, 1946

2,393,044

UNITED STATES PATENT OFFICE 2,393,044

QUICK-ACTING VOLTAGE-REGULATOR SYSTEM

Edwin L. Harder, Forest Hills, Pa., assignor to Westinghouse Electric Corporation, East Pittsburgh, Pa., a corporation of Pennsylvania Original application October 30, 1942, Serial No. 463,973. Divided and this application December 1, 1943, Serial No. 512,443

12 Claims. (Cl. 171—119)

This is a division of my application Serial No. 463,973, filed October 30, 1942, in which is described and claimed a minimum-voltage network and a protective relaying system utilizing the same.

My present invention relates to the application of my novel minimum-voltage network to a voltage-regulator which is adapted to control a polyphase synchronous machine, which is adapted for use on a polyphase line subject to single-phase faults, said machine having a quick-acting excitation-system of the kind described and claimed in the Evans et al. Patent 1,692,495, granted November 20, 1928 and assigned to the Westinghouse Electric & Manufacturing Company.

In the Evans et al. patent, it was shown to be desirable to quickly increase the excitation of a synchronous generator or condenser, at times of a single-phase fault on a polyphase system. It is not satisfactory to excite the voltage-regulator from a single phase of the line-voltage, because, if this were done, a single-phase fault on some other phase might, under some circumstances, produce a momentary voltage-rise on one of the unfaulted phases, which would cause the quick-response excitation-system to start to rapidly decrease the excitation, when an increase was actually required. This difficulty has been overcome by resort to a polyphase-responsive voltage-regulator.

An object of my present invention is to provide a substitute for the polyphase-responsive voltage-regulator of the quick-excited polyphase machine of the Evans et al. patent, and to utilize, in lieu thereof, a minimum-voltage-responsive device for energizing the voltage-regulator substantially in accordance with the lowest phase-voltage of the line, whereby, at times of a single-phase fault affecting any one of the phase-voltages of the line, the regulator is sure to promptly start the excitation-response in the proper direction.

Figure 1:
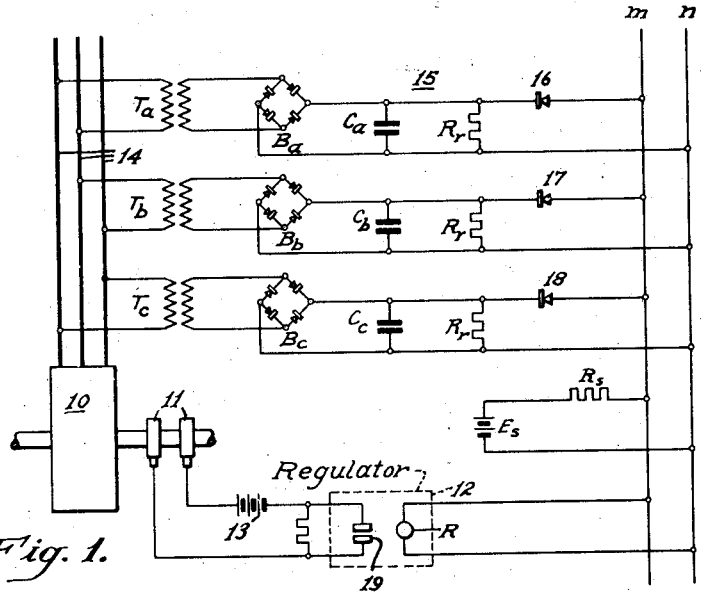
Figure 2:
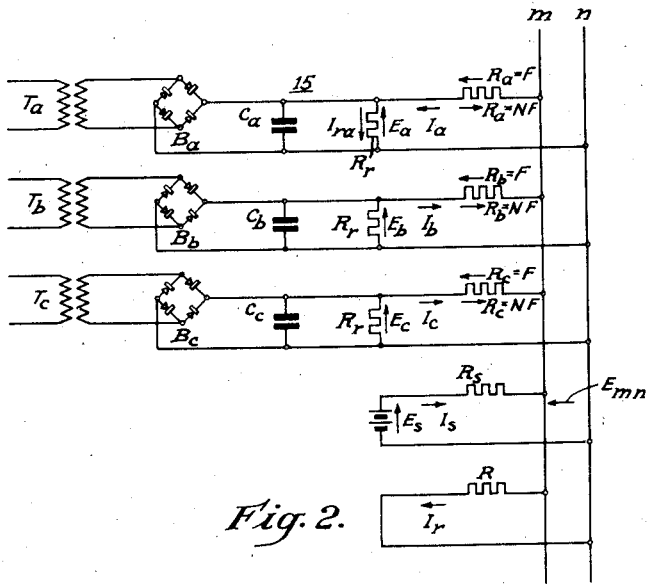

With the foregoing and other objects in view, my invention relates to the structures, apparatus, combinations, systems and methods hereinafter described and claimed, and illustrated in the accompanying drawing, wherein:

Figure 1 is a diagrammatic view of circuits and apparatus illustrating my invention as being applied to a minimum-voltage-responsive device in the form of a voltage-regulator for a quick-response excitation-system for a polyphase synchronous machine, and Fig. 2 is an equivalent-circuit diagram which will be referred to in the mathematical analysis of the minimum-voltage-selecting network shown in Fig. 1.

In Fig. 1, I have illustrated my invention in connection with a three-phase synchronous dynamo-electric machine 10, having an excitation-system represented by the slip-rings 11, the voltage-regulator 12, and the source of exciting-current energy 13. The primary windings of the synchronous machine 10 are connected to a three-phase line 14.

In accordance with my invention, as shown in Fig. 1, I provide a minimum-voltage-selective network 15, for responding to the smallest of the three line-voltages, which are derived by means of three potential-transformers $T_a$, $T_b$, $T_c$. The three derived line-voltages are rectified, through rectifier-bridges $B_a$, $B_b$ and $B_c$, the outputs of which are supplied to three rectified-current resistors $R_r$, $R_r$ and $R_r$, so as to produce, in the several resistors $R_r$, a unidirectional voltage-drop proportional to the magnitude of the corresponding phase-voltage of the line 14. Ordinarily, some sort of voltage-smoothing means is desirable, for smoothing out the ripples in the rectified current, and to this end I have illustrated filter-capacitors $C_a$, $C_b$ and $C_c$, shunting the respective resistors $R_r$, and intended to be symbolic of any desired ripple-suppressing means, a number of which are known to the art.

My minimum-voltage network 15 is also provided with a pair of output-terminals $m$, $n$ which are the terminals of a relay R or other voltage-responsive device which is intended to be responsive to the smallest of the three control-voltages appearing across the three rectified-current resistors $R_r$. The output-terminals $m$, $n$ of the network 15, in Fig. 1, are in the general case, also energized from an auxiliary unidirectional-current source of poor voltage-regulation, by which is meant a source of unidirectional voltage which decreases with increasing current, which is represented, in Fig. 1, by a battery or other constant-voltage source $E_s$ having a serially connected resistance $R_s$, or other impedance, either constant, or non-linearly responsive to the current-flow. The three line-voltage-controlled resistors $R_r$ are severally connected, in as many parallel-connected branch-circuits, across the output terminals $m$, $n$ of the network 15, in the same polarity as the auxiliary source $E_s$, that is, with the positive terminals of all of the sources connected to the network-terminal $m$, for example, except that, in the case of the three control-voltage resistors $R_r$, three serially connected rectifiers 16, 17 and 18, such as small contact-type rectifiers, or other asymmetrically conducting circuit-means, are respectively interposed in the circuit-connections, one in each, so as to provide a relatively free or good-conducting path for current flowing from the network-terminals $m$, $n$ to any one of three control-voltage resistors $R_r$, but interposing a relatively high resistance, or even substantially an open-circuit effect, for preventing current from freely flowing in the reverse direction.

In the particular system shown in Fig. 1, the relay R is the voltage-coil of the voltage-regulator 12, which is utilized to control, in some manner, the vibrating-contacts 19 of the regulator.

The operation of the minimum-voltage network 15 of Fig. 1 will best be understood by reference to the equivalent-circuit diagram of Fig. 2, in which the serially connected rectifiers 16, 17 and 18 have been replaced by their equivalent resistances $R_a$, $R_b$ and $R_c$, respectively, having a small resistance-value F in the forward direction, and a high resistance-value NF in the reverse-direction, as indicated by the arrows, N being the rectification-ratio. The relay R is represented, in Fig. 2, by its resistance R. The voltages appearing across the three control-voltage resistances $R_r$ are designated $E_a$, $E_b$, $E_c$, respectively, with the understanding that the subscript $a$ is applied to whichever one of three voltages happens to be the lowest, so that, if these three voltages $E_a$, $E_b$, and $E_c$ are not all equal, it is always assumed that $E_a$ designates the lowest of the three control-voltages.

In Fig. 2, the network-voltage is $$E_{mn} = \frac{\frac{E_a}{R_a} + \frac{E_b}{R_b} + \frac{E_c}{R_c} + \frac{E_s}{R_s}}{\frac{1}{R_a} + \frac{1}{R_b} + \frac{1}{R_c} + \frac{1}{R_s} + \frac{1}{R}} \quad (1)$$

As long as $E_a$, which is the designation applied to the smallest of the three controlling-voltages, is less than $E_{mn}$, $$R_a = F \quad (2)$$

Since F is small as compared to R, F will draw enough current to bring down $E_{mn}$ to a value close to $E_a$, so that $E_{mn}$ will be less than either one of the two larger controlling-voltages $E_b$ or $E_c$, so that $$R_b = R_c = NF \quad (3)$$

Equation 1 thus becomes $$E_{mn} = \frac{\frac{E_a}{F} + \frac{E_b + E_c}{NF} + \frac{E_s}{R_s}}{\frac{1}{F} + \frac{2}{NF} + \frac{1}{R_s} + \frac{1}{R}} \quad (4)$$

In order for $E_a$ to be less than $E_{mn}$, it must be less than the voltage $E_{0a}$ which the network would have had without the $E_a$-branch. Thus $$E_{0a} = \frac{\frac{F}{R_s}E_s + \frac{1}{N}(E_b + E_c)}{\frac{F}{R_s} + \frac{F}{R} + \frac{2}{N}} > E_a \quad (5)$$

This imposes an upper limit on $E_a$, above which the network-voltage $E_{mn}$ will not be responsive to $E_a$. This upper limit of $E_a$ may be designated, $$E_{max} = \frac{\frac{F}{R_s}E_s + \frac{1}{N}(E_b + E_c)}{\frac{F}{R_s} + \frac{F}{R} + \frac{2}{N}} \quad (6)$$

In order that the controlling-voltage $E_a$ may be dependent upon the alternating-current voltage of the transformer $T_a$, and substantially independent of the network-voltage $E_{mn}$ (so that $E_a$ will control $E_{mn}$, rather than the other way around), it is necessary, in the particular system shown in Fig. 2, that the current $I_a$ which is fed from the network-terminals $m$, $n$ to the terminals of the bridge-connected resistance $R_r$ which is energized from the lowest-voltage potential-transformer $T_a$ shall be less than the energizing-current $I_{ra}$ which is fed into said resistance $R_r$ from said transformer $T_a$, so as to determine $E_a = I_{ra}R_r$. Thus $$I_a < I_{ra} \quad (7)$$

whence $$\frac{E_{mn} - E_a}{F} < \frac{E_a}{R_r} \quad (8)$$

Substituting from (4) and solving, $$E_a > \frac{\frac{F}{R_s}E_s + \frac{1}{N}(E_b + E_c)}{\left(\frac{F}{R_s} + \frac{F}{R} + \frac{2}{N}\right)\left(1 + \frac{F}{R_r}\right) + \frac{F}{R_r}} \quad (9)$$

This imposes a lower limit on $E_a$, below which the network-voltage $E_{mn}$ will not be controlled by $E_a$. This lower limit of $E_a$ may be designated, $$E_{min} = \frac{\frac{F}{R_s}E_s + \frac{1}{N}(E_b + E_c)}{\left(\frac{F}{R_s} + \frac{F}{R} + \frac{2}{N}\right)\left(1 + \frac{F}{R_r}\right) + \frac{F}{R_r}} \quad (10)$$

Dividing 6 by 10, and rearranging the terms, $$\begin{aligned}\frac{E_{max}}{E_{min}} &= \frac{\left(\frac{F}{R_s} + \frac{F}{R} + \frac{2}{N}\right)\left(1 + \frac{F}{R_r}\right) + \frac{F}{R_r}}{\frac{F}{R_s} + \frac{F}{R} + \frac{2}{N}} \\ &= 1 + \frac{F}{R_r} + \frac{1}{\frac{R_r}{R_s} + \frac{R_r}{R} + \frac{2R_r}{NF}} \\ &= 1 + \frac{F}{R_r} + \frac{R}{R_r} \cdot \frac{1}{1 + \frac{R}{R_s} + \frac{2R}{NF}} \\ &= 1 + \frac{F}{R_r} + \frac{R}{\left(1 + \frac{R}{R_s}\right)R_r} \cdot \left(1 - \frac{1}{1 + \frac{N}{2}\left(\frac{F}{R_s} + \frac{F}{R}\right)}\right)\end{aligned} \quad (11)$$

The ratio of the measured voltage $E_{mn}$ to the control-voltage is found, from (4) and (6), to be $$K = \frac{E_{mn}}{E_a} = \frac{1 + \frac{E_{max}}{E_a}\left(\frac{F}{R_s} + \frac{F}{R} + \frac{2}{N}\right)}{1 + \frac{F}{R_s} + \frac{F}{R} + \frac{2}{N}} \quad (12)$$

The relay-response $E_{mn}$ is proportional to the control-voltage $E_a$ within a certain accuracy which we may designated as $\pm P$ percent, over the range from $E_a = E_{max}$ to $E_a = E_{min}$. A low percentage of error, P, is desired, both in relays which are required to respond accurately to $E_a$ over a considerable range, $E_{max}$ to $E_{min}$, and also in undervoltage or dropout relays in which the rate of change in the relay-voltage $E_{mn}$ should be as fast as possible, in comparison to the rate of change of the controlling-voltage $E_a$.

By successively substituting $E_a = E_{mnx}$ and $E_a = E_{min}$ in 12, and dividing the results, we find that $$\begin{aligned}Q &= \frac{100 - P}{100 + P} = \\ 1 - \frac{2P}{100 + P} &= \frac{K_1}{K_2} = \frac{1 + \frac{F}{R_s} + \frac{F}{R} + \frac{2}{N}}{1 + \frac{E_{max}}{E_{min}}\left(\frac{F}{R_s} + \frac{F}{R} + \frac{2}{N}\right)} \\ &= 1 - \frac{\left(\frac{E_{max}}{E_{min}} - 1\right)\left(\frac{F}{R_s} + \frac{F}{R} + \frac{2}{N}\right)}{1 + \frac{E_{max}}{E_{min}}\left(\frac{F}{R_s} + \frac{F}{R} + \frac{2}{N}\right)}\end{aligned} \quad (13)$$

Substituting from (11) and solving for P, $$\frac{P}{100} = \frac{F}{2R_r + F} = \frac{F}{2R_r} - \left(\frac{F}{2R_r}\right)^2 + \left(\frac{F}{2R_r}\right)^3 - \text{etc.} \quad (14)$$

The fraction $F/R_r$ will inherently be small, and hence as shown by Equation 14, the error P will be small. This is so, because the forward-resistance F of the rectifier 16 which is interposed between the network-voltage $E_{mn}$ and the control-voltage $E_a$ will naturally be made as small as practicable, while the bridge-connected resistance $R_r$ will have to be made large enough to avoid imposing an excessive volt-ampere burden $W_r$ on the potential-transformer $T_a$. When $E_a = E_b = E_c$, or $E_a = (E_b + E_c)/2$, this potential-transformer burden $W_r$ will be approximately equal to, $$W_r = \frac{(E_b + E_c)^2}{4R_r} \quad (15)$$

Since $F/R_r$ is thus small, Equation 11 shows that the spread between $E_{max}$ and $E_{min}$ is dependent mainly upon $$\frac{R}{R_r} \cdot \frac{1}{1 + \frac{R}{R_s} + \frac{2R}{NF}}$$

Obviously, the smaller the spread between $E_{max}$ and $E_{min}$, in Equation 11, the smaller may be the relay-resistance $R$ in comparison to the bridge-connected resistance $R_r$, thus increasing the relay-energy, which is, $$W = \frac{E_{mn}^2}{R} \quad (16)$$

From Equation 11, it is very evident that, for a given ratio of $E_{max}$ to $E_{min}$, over which the relay is to be responsive, and for a mechanical relay, which usually needs a maximum energy-input $W$ into the relay at any given relay-voltage $E_{mn}$, (as distinguished from a tube-type relay), it is necessary for the relay-resistance $R$ to be as small as possible, in comparison to the bridge-connected resistance $R_r$, which can be accomplished only by making $2R/NF$ and $R/R_s$ as small as possible in Equation 11. This means making $N$ and $R_s$ as large as possible, as will now be discussed.

To make $N$ large, means to choose a good rectifier for the serially connected rectifier 16 which is interposed between the network-voltage $E_{mn}$ and the control-voltage $E_a$.

To make $R_s$ as large as possible, it could be made infinite, which is to say that the source $E_s$ could be omitted, except for the requirement as to the maximum control-voltage $E_{max}$ to which the relay must respond. With $R_s$ infinite, Equation 6 shows that $E_{max}$ cannot be larger than $$(E_b + E_c)/(2 + NF/R)$$

and the higher the rectification-ratio $N$, the smaller will be the fraction $1/(1+NF/2R)$.

For any relay which is required to begin to respond to the smallest control-voltage $E_a$ before $E_a$ drops to a value as low as $$(E_b + E_c)/(2 + NF/R)$$

it is necessary to utilize the source $E_s$; and hence, for serving such a relay, $R_s$ cannot be made infinite.

For a network in which the source $E_s$ is required, in order to make the network responsive to a sufficiently high maximum-value $E_{max}$ of the control-voltage $E_a$, the network-constants may advantageously be selected, if desired, so as to obtain a maximum relay-energy $W$ at any desired relay-voltage $E_{mn}$. If it is desired, for example, to make the relay-energy $W$ as large as possible when the control-voltage $E_a$ has its maximum value $E_{max}$ at which $E_a$ will exercise any control over the relay-voltage $E_{mn}$, the relay energy $W$ under these conditions may be obtained by substituting from Equations 4 and 6 in Equation 16; and the conditions for a maximum relay-energy $W$ may be obtained by putting $$\frac{dW}{dR} = 0$$

yielding, $$R_s = \frac{1}{\frac{1}{R} - \frac{2}{NF}} = \frac{NFR}{NF - 2R} \quad (17)$$

This means that, if the source $E_s$ and its serially connected resistance $R_s$ are used, and if the relay-energy $W$ is to be as large as possible, the reverse-current resistance $NF$ of the serially connected rectifiers 16, 17 and 18 must be more than twice the relay-resistance $R$—perhaps at least four times as much, in any practical case.

Substituting from 17 in 11, we find that $$R = 2R_r \left(\frac{E_{max}}{E_{min}} - 1\right) - 2F \quad (18)$$

And substituting from 17 in 6, we find that $$E_s = \frac{\frac{2E_{max} - R(E_b + E_c)}{NF}}{1 - \frac{2R}{NF}} = \frac{2NFE_{max} - R(E_b + E_c)}{NF - 2R} \quad (19)$$

For the particular case in which it is required that the relay shall begin to respond to the smallest control-voltage $E_a$ when $E_a$ first begins to drop below $E_a = E_b = E_c$, $E_{max}$ will be $(E_b + E_c)/2$, and Equation 19 reduces to $$E_s = (E_b + E_c)\left(1 + \frac{1}{\frac{NF}{R} - 2}\right) = (E_b + E_c) \cdot \frac{NF - R}{NF - 2R} \quad (20)$$

Equations 17, 18 and 20 thus show the essential design-characteristics of a network designed to provide a maximum energy-input into the relay when the three control-voltages $E_a$, $E_b$, and $E_c$ are all equal, the network being also designed so that it is able to respond to $E_a$ when it first starts to drop below $E_b$ or $E_c$, that is, below $(E_b + E_c)/2$.

Where the potential transformers $T_a$, $T_b$ and $T_c$ are connected to the different phases of a constant-voltage line, which is the normal case, and where the network is not required to respond to the lowest control-voltage $E_a$ until it drops to some value below its normal maximum value, which is the normal line-voltage, it is possible to utilize a storage-battery for the auxiliary source $E_s$, and to make the voltage of this storage-battery somewhat less than the normal line-voltage, or somewhat less than $(E_b + E_c)/2$. Under these circumstances, under normal line-voltage conditions, the three line-voltages will trickle-charge the battery $E_s$ through the back-current-flow through the three serially connected rectifiers 16, 17 and 18 of Fig. 1, which are represented by the resistances $R_a$, $R_b$ and $R_c$ in Fig. 2, thus saving the cost of a separate trickle-charging outfit for the battery. In other instances, a direct-current station-bus may be utilized for the auxiliary source $E_s$.

In the operation of my invention as shown in Fig. 1, the regulator-coil $R$ is thus impressed with a voltage which is responsive to the smallest of the three phases of the polyphase voltage of the three-phase line 14, the manner of this response having fully been explained. Under normal line-voltage conditions, the vibrating regulator-contacts hold the voltage of the synchronous machine 10 at any desired value. If, now, a single-phase fault occurs on the line 14 to which the machine 10 is connected, the line-voltage may not always immediately reduce on both of the sound phases, but it will be sure to be immediately reduced on the faulted phase, and my minimum-voltage network causes the regulator 12 to respond to the smallest voltage, which will be the voltage of the faulted phase, thus causing the regulator to promptly start the excitation-response in the proper direction. Thus, when the regulator-contact 19 is closed, the excitation of the machine 10 is being quickly increased. In this manner, the benefits of quick-response excitation are obtained with a minimum-voltage response without necessitating a special regulator which is responsive to a polyphase voltage.

I claim as my invention:

1. The combination, with a polyphase line which is subject to single-phase faults, of a synchronous dynamo-electric machine connected thereto, an excitation-system which is at times capable of quickly increasing the excitation of said machine, a quick-acting voltage-responsive regulator for controlling said excitation-system, and a minimum-voltage-responsive device for energizing said regulator, said minimum-voltage-responsive device being selectively responsive substantially only to the lowest phase-voltage of the line, whereby, at times of a single-phase fault affecting any one of the phase-voltages of the line, the regulator is sure to promptly start the excitation-response in the proper direction.

2. The invention as defined in claim 1, characterized by said minimum-voltage-responsive device comprising a plurality of pairs of control-voltage terminals, means for energizing the different pairs of control-voltage terminals from different voltage-phases of the polyphase line, a pair of output-voltage terminals, and a separate asymmetrically conducting circuit-means for joining the pair of output-voltage terminals to each of the several pairs of control-voltage terminals for providing a good-conductor current-path for current flowing from the pair of output-voltage terminals to its associated pair of control-voltage terminals and for providing a resistively conducting current-path for current flowing from said associated pair of control-voltage terminals to the pair of output-voltage terminals, whereby, under operating conditions, current flows, at times, from the pair of output-voltage terminals to whichever pair of control-voltage terminals has the lowest control-voltage applied thereto from its associated voltage-phase, pulling down the voltage of the output-voltage terminals to a value approaching said lowest control-voltage.

3. The invention as defined in claim 1, characterized by said minimum-voltage-responsive device comprising a pair of supply-voltage terminals, a plurality of pairs of control-voltage terminals, means for energizing the different pairs of control-voltage terminals from different voltage-phases of the polyphase line, a pair of output-voltage terminals, circuit-means including resistance for joining the pair of output-voltage terminals to the pair of supply-voltage terminals for providing a resistively conducting current-path for current flowing from the pair of supply-voltage terminals to the pair of output-voltage terminals, and a separate asymmetrically conducting circuit-means for joining the pair of output-voltage terminals to each of the several pairs of control-voltage terminals for providing a good-conductor current-path for current flowing from the pair of output-voltage terminals to its associated pair of control-voltage terminals but not for current flowing in the reverse direction, whereby, under operating conditions, current flows, at times, from the pair of output-voltage terminals to whichever pair of control-voltage terminals has the lowest control-voltage applied thereto from its associated voltage-phase, pulling down the voltage of the output-voltage terminals to a value approaching said lowest control-voltage.

4. The invention as defined in claim 1, characterized by said minimum-voltage-responsive device comprising a plurality of sources, responsive to different voltage-phases of the polyphase line, for providing variable unidirectional control-voltages, a voltage-responsive device, and a separate asymmetrically conducting circuit-means for connecting each of the control-voltage sources in the same polarity to the voltage-responsive device for providing a good-conductor current-path for current flowing from the terminals of the voltage-responsive device to its associated control-voltage source and for providing a resistively conducting current-path for current flowing from said associated control-voltage source to the voltage-responsive device.

5. The invention as defined in claim 1, characterized by said minimum-voltage-responsive device comprising a source of unidirectional current having a voltage which decreases with increasing current, a voltage-responsive device connected thereto, a plurality of sources, responsive to different voltage-phases of the polyphase line, for providing a plurality of variable unidirectional control-voltages, and a separate asymmetrically conducting circuit- means for connecting each of the control-voltage sources in the same polarity to the voltage-responsive device as the first-mentioned source for providing a good-conductor current-path for current flowing from the terminals of the voltage-responsive device to its associated control-voltage source but not for current flowing in the reverse direction.

6. The invention as defined in claim 1, characterized by said minimum-voltage-responsive device comprising a voltage-responsive device, a plurality of control-circuit rectifiers, means for energizing the different rectifiers from different voltage-phases of the polyphase line, a separate resistance and a separate asymmetrically conducting circuit-means for connecting each of the control-circuit rectifiers in the same polarity to the voltage-responsive device, the constants being such that the current which is fed from the terminals of the voltage-responsive device to the terminals of the resistance which is also being energized from a voltage-phase, when the latter is low, is less than the energizing-current which is fed into said resistance from said voltage-phase.

7. The invention as defined in claim 1, characterized by said minimum-voltage-responsive device comprising a source of unidirectional current having a voltage which decreases with increasing current, a voltage-responsive device connected thereto, a plurality of control-circuit rectifiers, means for energizing the different rectifiers from different voltage-phases of the polyphase line, a separate resistance and a separate asymmetrically conducting circuit-means for connecting each of the control-circuit rectifiers to the voltage-responsive device in the same polarity as the first-mentioned source, the constants being such that the current which is fed from the terminals of the voltage-responsive device to the terminals of the resistance which is also being energized from a voltage-phase, when the latter is low, is less than the energizing-current which is fed into said resistance from said voltage-phase.

8. The invention as defined in claim 1, characterized by said minimum-voltage-responsive device comprising three or more sources of unidirectional voltages, a plurality of said sources being line-voltage-responsive sources which are responsive to different voltage-phases of the polyphase line, a pair of terminals for each of said sources, a pair of network-terminals, and a plurality of parallel-connected branch-circuits, one for each source, connected across said pair of network-terminals, each branch-circuit of said line-voltage-responsive sources including, in series with its source-terminals, a rectifier directed so as to preferentially conduct current in a direction against the voltage of its source.

9. The invention as defined in claim 1, characterized by said minimum-voltage-responsive device comprising three or more sources of unidirectional voltages, a plurality of said sources being line-voltage-responsive sources which are responsive to different voltage-phases of the polyphase line, an electro-responsive device, and a plurality of parallel-connected branch-circuits, one for each source, connected across terminals of said electro-responsive device, each branch-circuit of said line-voltage-responsive sources including, in series with its source, a rectifier directed so as to preferentially conduct current in a direction against the voltage of its source.

10. The invention as defined in claim 1, characterized by said minimum-voltage-responsive device comprising, a plurality of sources responsive to different voltage-phases of the polyphase line, a plurality of control-circuit resistors, rectifier-means for permitting current-flow in only one direction from each of said line-voltage-responsive sources to a corresponding one of said control-circuit resistors, a pair of network-terminals, and a plurality of parallel-connected branch-circuits, one for each control-circuit resistor, connected across said pair of network-terminals, each branch-circuit including a rectifier directed so as to preferentially conduct current in a direction against the voltage impressed thereon by its line-voltage-responsive source.

11. The invention as defined in claim 1, characterized by said minimum-voltage-responsive device comprising, a plurality of sources responsive to different voltage-phases of the polyphase line, a plurality of control-circuit resistors, rectifier-means for permitting current-flow in only one direction from each of said line-voltage-responsive sources to a corresponding one of said control-circuit resistors, an electro-responsive device, and a plurality of parallel-connected branch-circuits, one for each control-circuit resistor, connected across the terminals of said electro-responsive device, each branch-circuit including a rectifier directed so as to preferentially conduct current in a direction against the voltage impressed thereon by its line-voltage-responsive source.

12. The invention as defined in claim 1, characterized by said minimum-voltage-responsive device comprising means for deriving a polyphase control-voltage in response to the polyphase line-voltage, a separate conversion-means associated with each phase of the derived control-voltage and having a pair of control-voltage terminals having a unidirectional voltage thereacross which is responsive to its phase of the polyphase control-voltage, a unidirectional-current electro-responsive device, and a separate circuit-means including a serially connected rectifier for individually connecting each pair of control-voltage terminals to the terminals of said electro-responsive device in such manner as to freely draw current away from the terminals of the electro-responsive device to the lowest-voltage control-voltage terminals when the lowest control-voltage is lower than the voltage of the electro-responsive device, whereby, under such circumstances, the voltage of the electro-responsive device is brought down to a value approaching the lowest control-voltage.

EDWIN L. HARDER.